United States Patent
Castellano et al.

(10) Patent No.: US 6,364,187 B1
(45) Date of Patent: Apr. 2, 2002

(54) HOLSTER FOR SMALL OBJECTS

(76) Inventors: Kimberly M Castellano, 3453 Jade Way, Pomona, CA (US) 91767; Douglas W. Shoemaker, 19034 Donington St., Glendora, CA (US) 91740

( * ) Notice: Subject to any disclaimer, the term of this patent is extended or adjusted under 35 U.S.C. 154(b) by 0 days.

(21) Appl. No.: 09/771,538

(22) Filed: Jan. 29, 2001

(51) Int. Cl.[7] ............................................. A45C 1/04
(52) U.S. Cl. ..................... 224/675; 224/236; 224/240; 224/242; 224/901.6
(58) Field of Search ............................... 224/654, 665, 224/671, 677, 236, 240, 242, 246, 250, 675, 901.6; D3/226, 230

(56) References Cited

U.S. PATENT DOCUMENTS

| | | | |
|---|---|---|---|
| 1,547,800 A | | 7/1925 | Franz |
| 3,977,582 A | * | 8/1976 | McMahon .................. 224/246 |
| 4,420,104 A | * | 12/1983 | Dilenno ...................... 224/250 |
| D291,389 S | * | 8/1987 | Cymes ....................... 224/236 |
| D293,628 S | * | 1/1988 | Teachey ..................... 224/240 |
| D293,857 S | * | 1/1988 | Stout .......................... 224/250 |
| 5,002,214 A | | 3/1991 | Caranci |
| 5,094,376 A | | 3/1992 | Baruch |
| 5,201,447 A | | 4/1993 | Bumb et al. |
| 5,215,238 A | | 6/1993 | Baruch |
| 5,255,835 A | | 10/1993 | Burks |
| D344,630 S | * | 3/1994 | Doerksen ..................... D3/228 |
| D361,199 S | * | 8/1995 | Taylor .......................... D3/226 |
| 5,441,187 A | * | 8/1995 | Mixson ...................... 224/192 |
| 5,450,993 A | | 9/1995 | Guerrero et al. |
| 5,503,316 A | * | 4/1996 | Stewart ...................... 224/312 |
| 5,535,928 A | * | 7/1996 | Herring ....................... 224/250 |
| 5,586,701 A | * | 12/1996 | Kim ........................... 224/236 |
| 5,711,469 A | * | 1/1998 | Gormley et al. ............. 224/236 |
| 5,724,707 A | | 3/1998 | Kirk et al. |
| 5,816,459 A | | 10/1998 | Armistead |
| 5,855,307 A | * | 1/1999 | Biddick et al. ........ 128/205.22 |
| D415,390 S | * | 10/1999 | Winnington-Ingram ...... D3/202 |
| 5,991,925 A | | 11/1999 | Wu |
| 6,065,658 A | | 5/2000 | Hashimoto |
| 6,109,496 A | | 8/2000 | Andrew et al. |
| 6,182,878 B1 | * | 2/2001 | Racca ........................ 224/236 |
| 6,209,769 B1 | * | 4/2001 | Seals et al. ................. 224/583 |

* cited by examiner

*Primary Examiner*—Stephen P. Garbe
(74) *Attorney, Agent, or Firm*—Sheldon & Mak; Daniel L. Anderson

(57) ABSTRACT

A holster for retaining small objects, such as portable cellular phones and portable two-way radios. The holster includes a body, a belt attachment loop and a retaining strap. The retaining strap optionally includes a pair of elastic cords to which is attached a forward attachment tab. The attachment tab is removably attached to the forward side of the body by, for example, use of hook and loop fasteners.

20 Claims, 2 Drawing Sheets

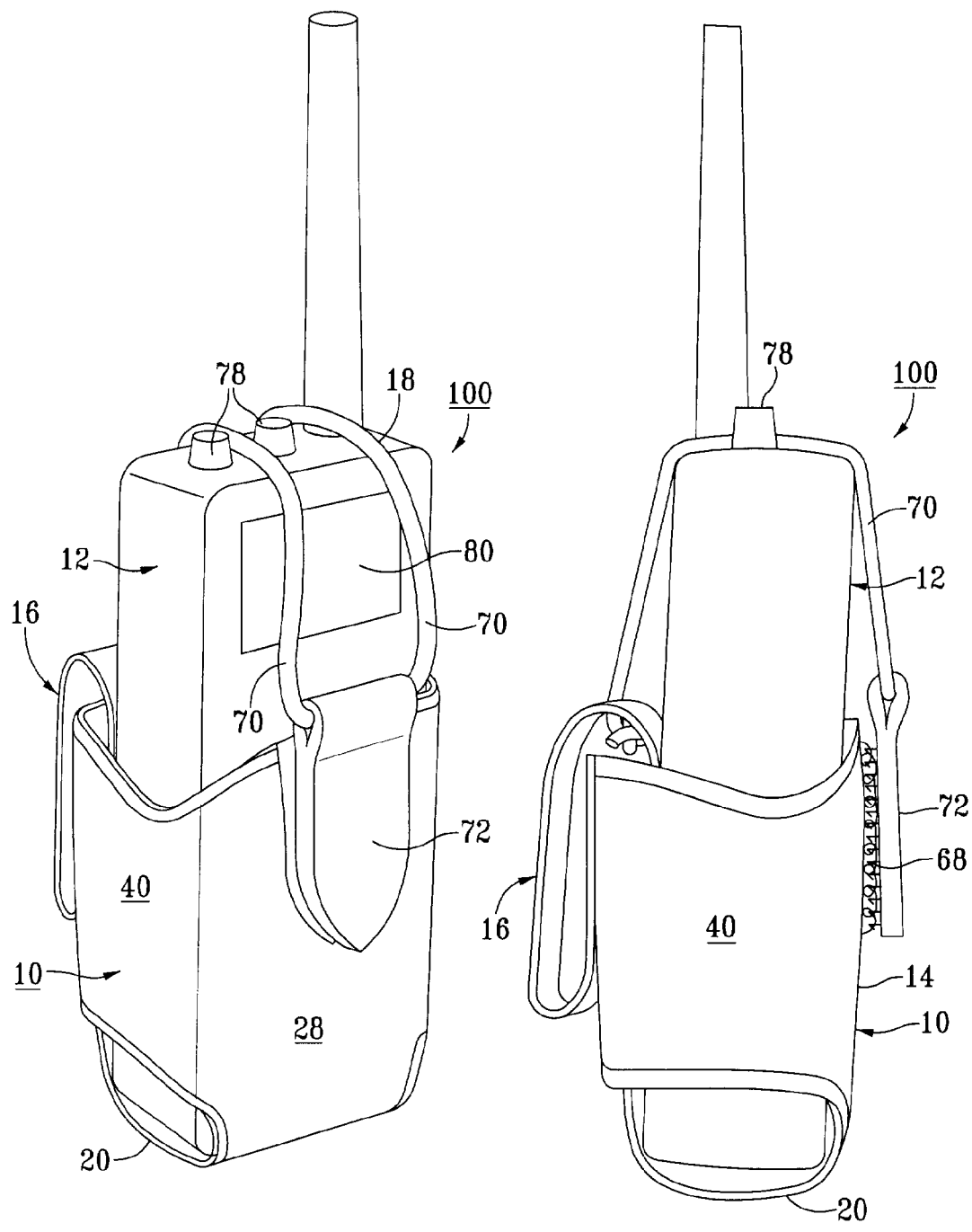

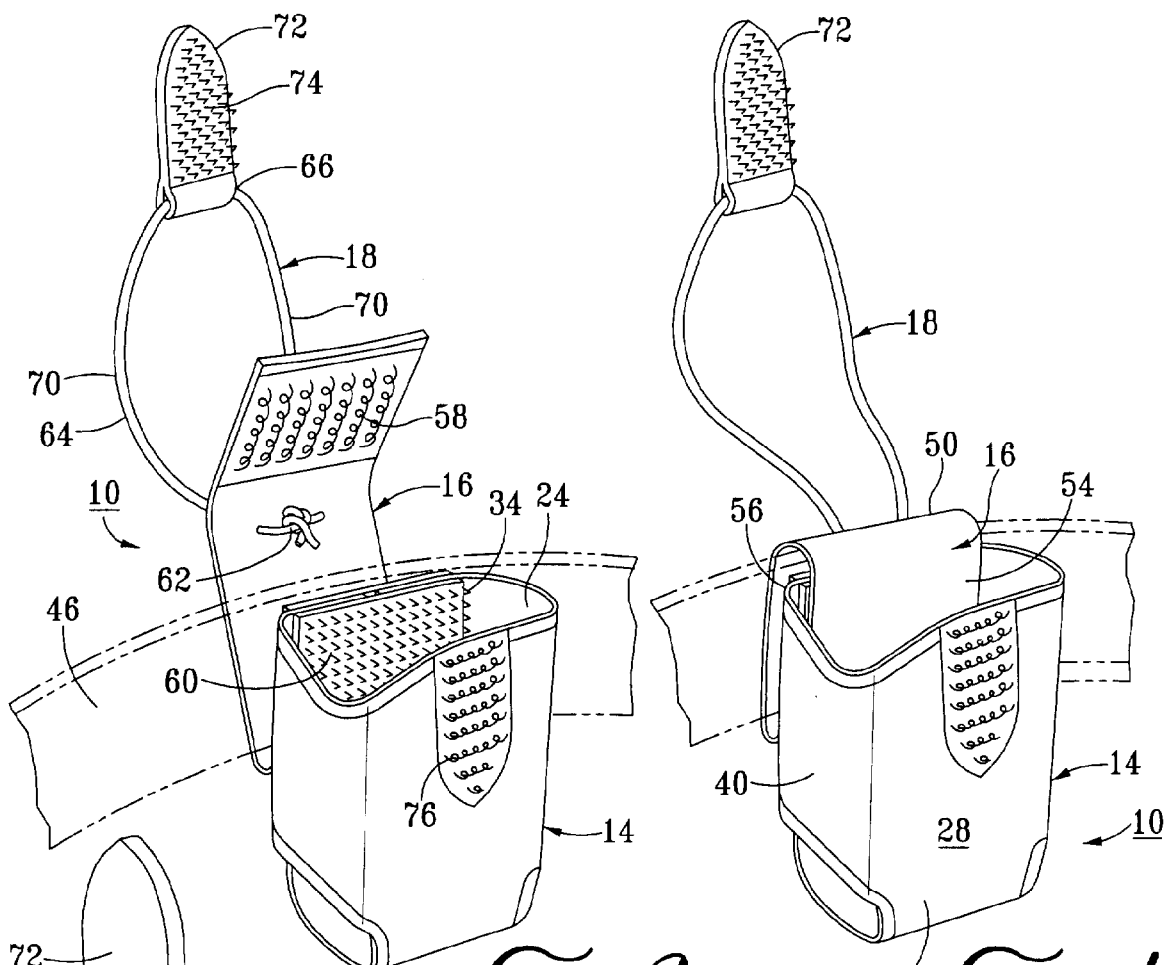
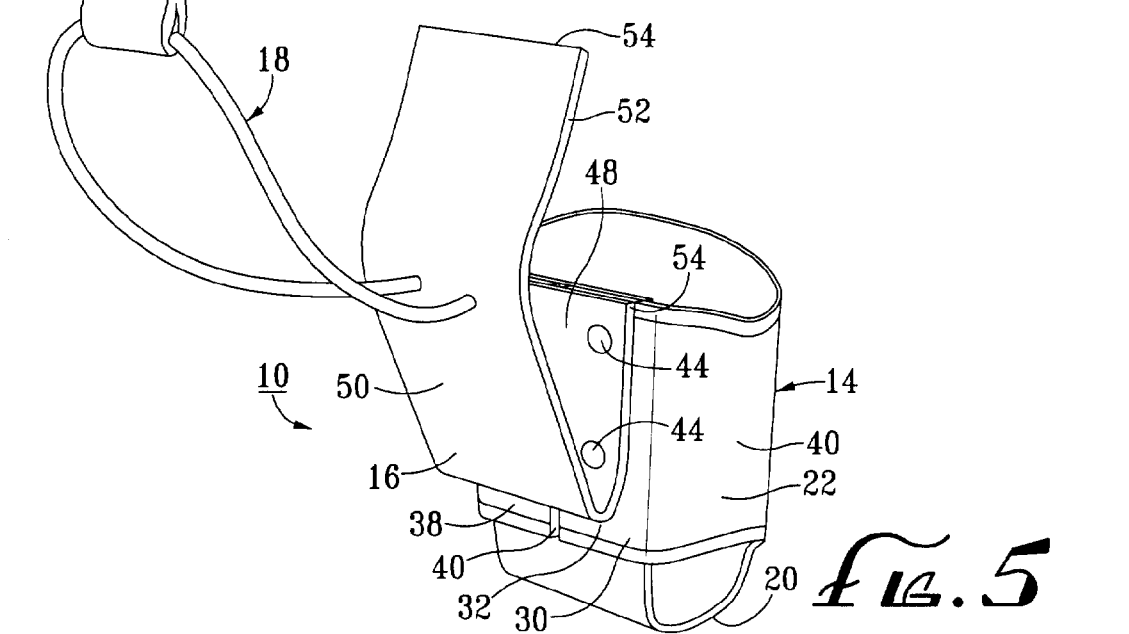

HOLSTER FOR SMALL OBJECTS

FIELD OF THE INVENTION

This invention relates generally to devices for carrying objects on the person of the user and, more specifically, to devices for carrying small objects on the person of the user.

BACKGROUND OF THE INVENTION

There are many devices known for carrying small objects on the person of the user. Where that small object is a cellular phone or a portable two-way radio, none of the carrying devices on the market are fully satisfactory. Such prior art "holsters" often do not allow access to the cellular phone or two-way radio operating buttons unless the cellular phone or two-way radio is removed from the device. Also, many such prior art holsters do not allow the user to quickly remove the cellular phone or two-way radio from the holster and/or to easily replace the cellular phone or the two-way radio back into the holster. These deficiencies in the prior art are critical for police officers carrying portable two-way radios. Police officers need to be able to operate the radios without having to remove the radio from the holster. When the officer does need to remove the radio from the holster, it is often under emergency conditions, where speed is of paramount importance.

Other problems associated with many prior art holsters involve a lack of sturdiness, an inability to attach the holster to a wide variety of belt widths, and excessive complexity of design—resulting in undue expense to manufacture.

Accordingly, there is a need for a holster for small objects which will avoid the aforementioned problems in the prior art.

SUMMARY

The invention satisfies this need. The invention is a holster for retaining small objects. The holster comprises (a) a body having a bottom wall and one or more side walls, the bottom wall and the one or more side walls cooperating to define a chamber with a top opening, the body having a forward side and a rearward side, the rearward side having an external surface and an internal surface, (b) a belt attachment loop, and (c) a retaining strap having a first end portion, a central portion and a second end portion, the first end portion being disposed proximate to the rearward side of the body, the second end portion being removably attached to the forward side of the body, the central portion of the retainer strap comprising a pair of elastic cords, the second end portion comprising a connection tab attached to the pair of elastic cords, the connection tab being removably attached to the forward side of the body.

DRAWINGS

These features, aspects and advantages of the present invention will become better understood with regard to the following description, appended claims and accompanying figures where:

FIG. 1 is an isometric view of a holster and a two-way radio having features of the invention;

FIG. 2 is a side view of the holster and two-way radio illustrated in FIG. 1;

FIG. 3 is an isometric view of the holster (alone) illustrated in FIG. 1, showing the belt attachment loop in the open position;

FIG. 4 is an isometric view of the holster illustrated in FIG. 1, showing the belt attachment loop in the closed position; and FIG. 5 is an isometric view of the holster (alone) illustrated in FIG. 1, showing the rear side of the holster with the belt attachment loop in the open position.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a holster 10 suitable for retaining a small object, such as a portable cellular phone or a portable two-way radio 12. The holster 10 comprises a body 14, a belt attachment loop 16 and a retaining strap 18.

The body 14 has a bottom wall 20 and one or more side walls 22. The bottom wall 20 and the one or more side walls 22 cooperate to define a chamber 24 with a top opening 26. The body 14 has a forward side 28 and a rearward side 30. The rearward side 30 has an external surface 32 and an internal surface 34.

In the embodiment illustrated in the drawings, the one or more side walls 22 comprise a front wall 36, a rear wall 38 and a pair of opposed side walls 40. The chamber 24 is parallelepiped in shape. The body 14 is initially constructed from a flat blank. The flat blank is T-shaped, having a pair of outwardly extending wing members and a downwardly extending tail member. The wing members are folded to form an enclosed loop having a parallelepiped shape. The folding of the wing members forms the opposed side walls 40 and the rear wall 38 of the body 14. The rear wall 38 of the body 14 has a seam 42 where the two opposed wing members are joined. The tail member is folded up into the enclosed loop to form the bottom wall 20 of the body 14. The pair of wing members are fastened to the tail member, such as by rivets 44, to complete the manufacture of the body 14.

Typically, the body 14 is made from a sturdy material, preferably a semi-rigid material, most preferably a relatively rigid leather.

The belt attachment loop 16 can be any suitable loop of material attached to the rearward side 30 of the body 14 to allow the attachment of the holster 10 to the belt 46 of the user. In the embodiment of the invention illustrated in the drawings, the belt attachment loop 16 is of an optional preferred design. In this preferred design, the belt attachment loop 16 has a first end portion 48, a central portion 50 and a second end portion 52. The first end portion 48 and the second end portion 52 each comprise a terminus 54. The first end portion 48 is attached to the rearward side 30 of the body 14. This is optionally accomplished using the same fasteners 44 used in the manufacture of the body 14. In the embodiment illustrated in the drawings, the terminus 54 of the first end portion 48 is disposed proximate to the top portion 26 of the body 14.

The second end portion 52 is removably attached to the body 14. By "removably attached," it is meant that the second end portion 52 can be readily attached to the body 14 and detached from the body 14 without the use of tools. In the embodiment illustrated in the drawings, the second end portion 52 of the belt attachment loop 16 is removably attached to the body 14 by hook and loop fasteners 56. A first moiety 58 of the hook and loop fasteners 56 is attached to the underside of the second end portion 52 and the second moiety 60 of the hook and loop fasteners 56 is attached to the internal surface 34 of the rearward side 30 of the body 14. In addition to the use of hook and loop fasteners 56, other fasteners can also be used, such as snaps, hooks and buttons.

By this preferred design of the belt attachment loop 16, the holster 10 is readily attached to virtually any width belt 46 of the user by slipping the first end portion 48 up underneath the user's belt 46 and then folding the central portion 50 of the belt attachment loop 16 over the user's belt 46 and over the uppermost portion of the rearward side 30 of the body 14. The second end portion 52 is then attached to the interior surface 34 of the rearward side 30 of the body 14, using the hook and loop fasteners 56.

The retaining strap 18 has a first end portion 62, a central portion 64 and a second end portion 66. The first end portion 62 is disposed proximate to the rearward side of the body 30. In the embodiment illustrated in the drawings, the first end portion 62 of the retaining strap 18 is attached to the central portion 50 of the belt attachment loop 16.

The second end portion 66 of the retaining strap 18 is removably attached to the forward side 28 of the body 14. By "removably attached," it is meant that the retaining strap 18 is readily attached to and detached from the forward side 28 of the body 14 without the use of tools. In the embodiment illustrated in the drawings, this is accomplished using hook and loop fasteners 68. Other suitable fasteners can also be used, such as snaps, hooks and buttons.

In the embodiment illustrated in the drawings, the central portion 64 of the retaining strap 18 comprises a pair of elastic cords 70 and the second end portion 66 of the retaining strap 18 comprises a connection tab 72 attached to the pair of elastic cords 70. In this embodiment, the connection tab 72 is removably attached to the forward side 28 of the body 14. In the preferred embodiment wherein hook and loop fasteners 68 are employed, a first moiety 74 of the hook and loop fasteners 68 is attached to the undersigned of the connection tab 72 and the second moiety 76 of the hook and loop fasteners 68 is attached to the forward side 28 of the body 14.

The invention can easily be used to retain a small object, such as a cellular phone or a portable two-way radio 12, to the person of the user. In the embodiment illustrated in the drawings, a two-way radio 12 is shown disposed within the holster 10. In this combination 100, the two-way radio 12 is firmly retained within the holster 10, but in such a way that the radio's operating buttons 78 and the radio's speaker/microphone 80 are left virtually uncovered. This allows the user to operate the two-way radio 12 without removing the two-way radio 12 from the holster 10.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A holster suitable for retaining a small object, the holster comprising:
   (a) a body having a bottom wall and one or more side walls, the bottom wall and the one or more side walls cooperating to define a chamber with a top opening, the body having a forward side and a rearward side, the rearward side having an external surface and an internal surface;
   (b) a belt attachment loop; and
   (c) a retaining strap having a first end portion, a central portion and a second end portion, the first end portion being disposed proximate to the rearward side of the body, the second end portion being removably attached to the forward side of the body, the central portion of the retainer strap comprising a pair of elastic cords, the second end portion comprising a connection tab attached to the pair of elastic cords, the connection tab being removably attached to the forward side of the body.

2. The holster of claim 1 wherein the body is leather.

3. The holster of claim 1 wherein the chamber is parallelepiped in shape.

4. The holster of claim 1 wherein the belt attachment loop has a first end portion, a central portion and a second end portion, the first end portion and the second end portion each comprising a terminus, the first end portion being attached to the body and the second end portion being removably attached to the body.

5. The holster of claim 4 wherein the second end portion of the belt attachment loop is removably attached to the body by hook and loop fasteners.

6. The holster of claim 4 wherein the first end portion of the belt attachment loop is attached to the external surface of the rearward side of the body, the terminus of the first end portion being disposed proximate to the top opening and the second end portion being attached to the internal surface of the rearward side of the body.

7. The holster of claim 1 wherein the second end portion of the retaining strap is removably attached to the forward side of the body by hook and loop fasteners.

8. The holster of claim 4 wherein the first end portion of the retaining strap is attached to the central portion of the belt attachment loop.

9. The holster of claim 1 further comprising a portable two-way radio disposed within the chamber.

10. A holster suitable for retaining a small object, the holster comprising:
    (a) a body having a bottom wall and one or more side walls, the bottom wall and the one or more side walls cooperating to define a chamber with a top opening, the body having a forward side and a rearward side, the rearward side having an external surface and an internal surface;
    (b) a belt attachment loop having a first end portion, a central portion and a second end portion, the first end portion and the second end portion each having a terminus, the first end portion being attached to the external surface of the rearward side of the body, the terminus of the first end portion being disposed proximate to the top opening, the second end portion being attached to the internal surface of the rearward side of the body; and
    (c) a retaining strap having a first end portion, a central portion and a second end portion, the first end portion being disposed proximate to the rearward side of the body, the second end portion being removably attached to the forward side of the body.

11. The holster of claim 10 wherein the chamber is parallelepiped in shape.

12. The holster of claim 10 wherein the body is leather.

13. The holster of claim 10 wherein the second end portion of the belt attachment loop is removably attached to the body by hook and loop fasteners.

14. The holster of claim 10 wherein the second end portion of the retaining strap is removably attached to the forward side of the body by hook and loop fasteners.

15. The holster of claim 10 further comprising a portable two-way radio disposed within the chamber.

16. A holster suitable for retaining a small object, the holster comprising:

(a) a body having a bottom wall and one or more side walls, the bottom wall and the one or more side walls cooperating to define a chamber with a top opening, the body having a forward side and a rearward side, the rearward side having an external surface and an internal surface;

(b) a belt attachment loop having a first end portion, a central portion and a second end portion, the first end portion and the second end portion each having a terminus, the first end portion being attached to the external surface of the rearward side of the body, the terminus of the first end portion being disposed proximate to the top opening, the second end portion being attached to the internal surface of the rearward side of the body; and (c) a retaining strap having a first end portion, a central portion and a second end portion, the first end portion being disposed proximate to the rearward side of the body, the second end portion being removably attached to the forward side of the body, the central portion of the retainer strap comprising a pair of elastic cords, the second end portion comprising a connection tab attached to the pair of elastic cords, the connection tab being removably attached to the forward side of the body by hook and loop fasteners.

17. The holster of claim 16 wherein the chamber is parallelepiped in shape.

18. The holster of claim 16 wherein the body is leather.

19. The holster of claim 16 wherein the second end portion of the belt attachment loop is removably attached to the body by hook and loop fasteners.

20. The holster of claim 16 further comprising a portable two-way radio disposed within the chamber.

* * * * *